United States Patent [19]

Belka

[11] Patent Number: 5,695,206

[45] Date of Patent: Dec. 9, 1997

[54] MUDGUARD ARRANGEMENT

[75] Inventor: Heinrich Belka, Leopoldshöhe, Germany

[73] Assignee: SKS Metaplast Scheffer-Klute GmbH, Germany

[21] Appl. No.: 505,858

[22] Filed: Jul. 24, 1995

[30] Foreign Application Priority Data

Jul. 29, 1994 [DE] Germany .................. 44 26 918.8

[51] Int. Cl.⁶ .................................................. B62B 9/16
[52] U.S. Cl. ........................ 280/152.1; 280/852; 403/329
[58] Field of Search ................. 280/152.1, 152.2, 280/848, 852, 304.3; 301/57, 61; 248/548, 909; 403/326, 329

[56] References Cited

FOREIGN PATENT DOCUMENTS

| 666323 | 7/1965 | Belgium ...................... 280/152.1 |
|---|---|---|
| A-2443372 | 7/1980 | France . |
| 2528789 | 6/1982 | France . |
| A-2528789 | 12/1983 | France . |
| 40 20 562 | 6/1990 | Germany . |
| 42 41 371 | 12/1992 | Germany . |
| 4232539 | 3/1994 | Germany ...................... 280/152.1 |
| 16160 | 8/1899 | United Kingdom ............. 280/152.1 |
| 20913 | 10/1899 | United Kingdom ............. 280/152.1 |
| 24395 | 11/1903 | United Kingdom ............. 280/152.1 |
| 29780 | 12/1910 | United Kingdom . |
| 230268 | 3/1924 | United Kingdom ............. 280/152.1 |
| 249691 | 4/1925 | United Kingdom ............. 280/152.1 |
| 253379 | 7/1925 | United Kingdom ............. 280/152.1 |

*Primary Examiner*—Brian L. Johnson
*Assistant Examiner*—Michael Mar
*Attorney, Agent, or Firm*—Nilles & Nilles, S.C.

[57] ABSTRACT

In a bicycle, the front wheel mudguard is fastened with the aid of wire-shaped stays which are in each case bent to form an eye at that end which is adjacent to the axle of the wheel. The eye is held by latching in a receiving pocket which is located in a shaped part fastened to the front wheel fork. In this manner, the front wheel is prevented from locking should objects penetrate into the gap between the mudguard and the tire while in motion.

19 Claims, 3 Drawing Sheets

MUDGUARD ARRANGEMENT

BACKGROUND OF THE INVENTION

1. Field of the Invention

In modern bicycles it is customary to fasten the stays for securing the mudguards next to the axle of the relevant wheel. This geometry requires stay lengths at which the mudguard is only at the desired distance from the wheel circumference in the position envisaged by the design. If the stay is pivoted out of the position envisaged by the design, for example in the case of a front wheel toward the fork head, the distance between the mudguard and the tire is reduced. Pivoting in this manner may, for example, result if an elongate object, for example a branch, is wedged between the stay and the rotating wheel. The rotating wheel carries the stay along via the wedged object and, due to the geometrical conditions, the mudguard comes to bear on the tire, resulting in immediate, very sudden locking of the wheel.

Similar problems may occur if stones hurled upwards become wedged in the gap between the tire and mudguard, likewise resulting in the mudguard being carried along towards the fork head. These problems are all the more serious the less resistant the mudguard is. The steadiness of the previously customary, heavy steel-sheet mudguards was so great that the accidents described did not have to be taken into consideration. Like mudguards made of plastic, modern, thin-walled light-metal mudguards do not provide resistance against bending and therefore are also less capable of holding the stay securely in the correct position.

2. Description of the Prior Art

In order to prevent the risk of an accident by the wheels locking as a consequence of the mudguard stays pivoting, it has, for example, been disclosed in German Offenlegungsschrift 40 20 562 to offset the fastening point on the front-wheel fork clearly away from the dropout towards the fork head. In the normal state, the mudguard stay then points obliquely downward and, should pivoting upward take place, the distance between the mudguard and tire increases instead of being reduced, as is otherwise the case in the prior art.

Another possibility of connecting the stays of the mudguard releasably to the fork is described in French Patent 2 528 789. In this solution, an eye is bent onto that end of the stay which is adjacent to the dropout, with the aid of which eye the stay is screwed, with the assistance of a screw, to a clasp bent out of a leaf spring. The leaf-spring clasp is forked at that end which is remote from the stay and can thus be pushed over the fork tube. This type of connection can, of course, be achieved with low action of force. The risk of an accident due to a stay becoming wedged on the tire is eliminated in this case.

However, the fit of the clasp on the fork tube can leave a lot to be desired. As is known, the fork tube tapers from the fork head towards the dropout in conjunction with the shaking occurring during use, the clasp has the tendency to slip on the fork tube towards the dropout. The clasp loses its hold in the process and, at the point at which the fork tube merges into the flat dropout, there is an increased risk of the clasp, even without a relatively large action of force, slipping off the fork tube solely because of the shaking.

SUMMARY OF THE INVENTION

Taking this as the starting point, the object of the invention is to provide a mudguard arrangement which, on the one hand, ensures a secure hold of the mudguard stays and, on the other hand, does not involve the risk of the wheel locking.

This object is achieved according to the invention by means of a latch member which is provided at the radially inner end of the stay and a latching device which is rigidly attached to one of the dropouts and which releasably receives the latch member. The latching device is configured to hold the latch member with a latching force of a designated magnitude. The latch member and the latching device are configured relative to one another such that, whenever a force is imposed on the stay which opposes the latching force and which has a magnitude which is greater than the specified magnitude of the latching force, the latch member automatically releases from the latching device without additional resistance.

As a result of the rigid attachment of the latching device to the fork or dropout thereof, the securing point of the stay on the fork remains fixed. It is also not possible for the latching device to be removed from the fastening position in the event of shaking, resulting, to this extent, in the structural conditions remaining the same. In contrast, the connection between the stay and the latching device can be separated. Should a stone become wedged between the mudguard and the tire, or an elongate object pass into the spokes, both instances leading to the rotating wheel carrying along the mudguard or the stay, it is not possible for locking to come about since, when a predetermined force, is exceeded, the latching device releases the stay and locking of the relevant wheel is hence ruled out. This arrangement produces, in particular, good protection for the front wheel whose very sudden locking may lead to somersaulting.

The most simple possibility of obtaining the latching means consists in appropriately thickening the relevant end of the stay. In the most simple manner, this thickening may take place by means of an eye which, for example, is bent onto the wire-shaped stay. The eye has an advantage which consists in securing the stay against rotation around its longitudinal axis it also, it permits a sufficiently tight fit in the latching device as a result of which good lateral-guiding properties are brought about. This eye may be the same eye which has hitherto been formed in the stays according to the prior art for the purpose of directly screwing the stay to the dropout. Furthermore, compared with, for example, a recessed groove, the eye avoids weakening the stay.

Good stabilization of the mudguard against vibration is attained if on each side of the mudguard there are provided at least two stays which converge in a V shape toward the fork and advantageously merge there integrally into each other. The transition point can in turn be bent to form an eye with the result that it is possible for the same latching devices to be used as in the case of an individual stay on each side of the wheel. As a result of the eye or loop there is produced after this, prior to the transition into the straight portion of the stays, a constriction or tapered portion which interacts in the desired manner with the latching device.

The latching device is advantageously a housing which is provided with a corresponding pocket and which is fastened to the fork or dropout thereof by means of screws, for example.

The pocket is in the shape of a slot and is matched to the contour of the relevant stay end in order to ensure that the stay is secured well. The use of a pocket in the housing furthermore inevitably establishes the insertion stroke of the stay as it is introduced into the latching device. Forces of pressure acting in this direction are consequently not capable of changing the position of the stay in the latching device.

In order to obtain the latching action, the housing contains leaf-spring-like latching elements which preferably constitute the narrow side walls of the pocket-shaped recess in the housing. As a result, production is considerably simplified and there is also maximum stability.

BRIEF DESCRIPTION OF THE DRAWINGS

An exemplary embodiment of the subject-matter of the invention is illustrated in the drawing, in which.

DESCRIPTION OF THE PREFERRED EMBODIMENTS

Figure 1:
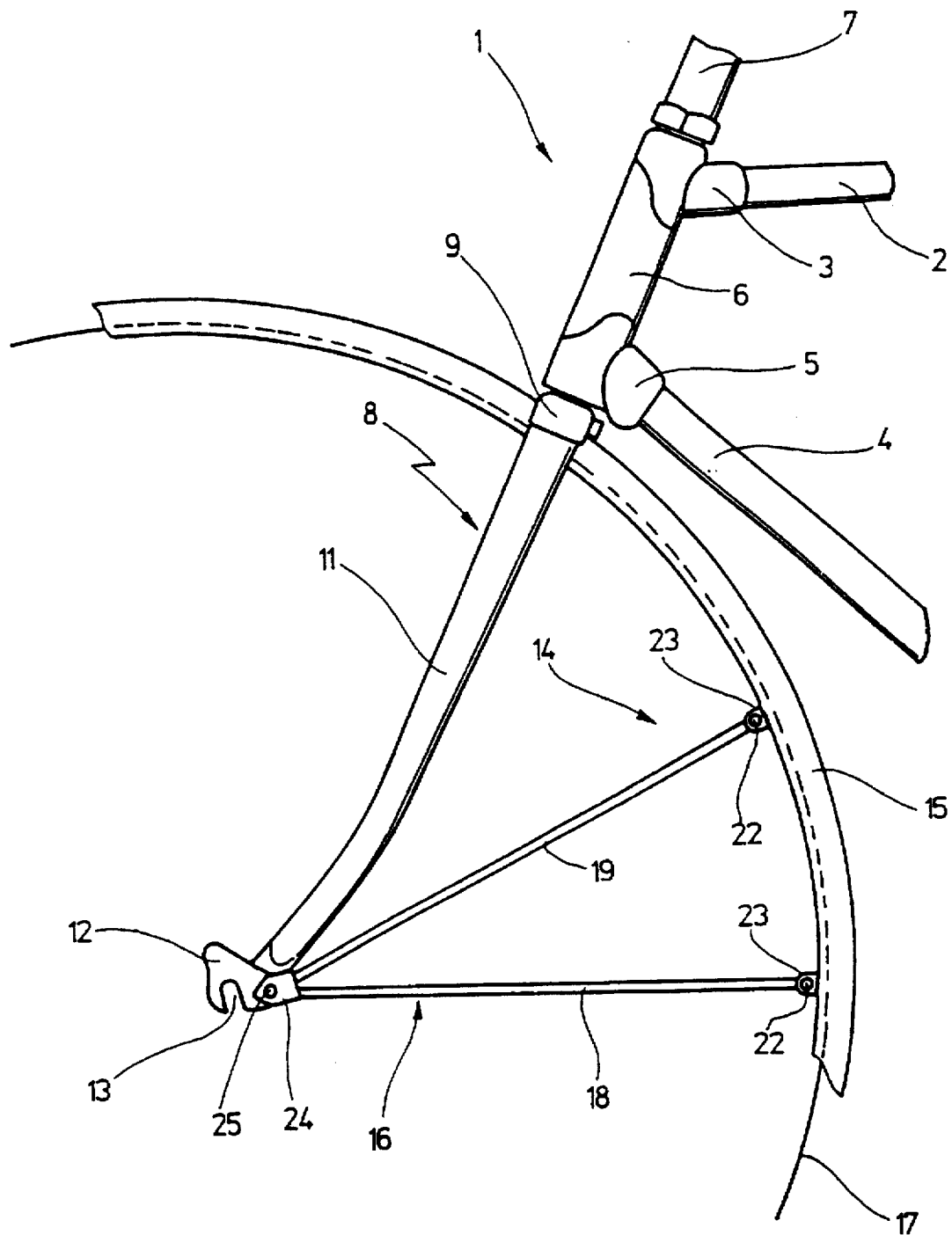
FIG. 1 shows the front end of a bicycle with a side view of a bicycle mudguard secured according to the invention.

FIG. 1 is a diagrammatic illustration of a detail of a front end 1 of a bicycle, the toptube 2 of which is connected to a steering-head tube 6 via a steering-head socket 3 and the downtube 4 of which via a steering-head socket 5. The steering-head tube 6 extends between the two steering-head sockets 3 and 5.

A handlebar stem 7 of a front-wheel fork 8 is mounted rotatably in the steering-head tube 6. The fork 8 has a fork head 9 to whose upper side the above-mentioned handlebar stem 7 is fastened and from which two fork tubes 11 lead away downward, in parallel and spaced apart from one another. For reasons of illustration, of the two fork tubes 11, only the one which faces the observer is visible. At their free, lower end the two fork tubes 11 bear a plate 12 which constitutes the dropout of the fork tube 11. A downwardly open slot 13, which serves to receive an axle, is included in a known manner in this dropout 12.

Figure 2:
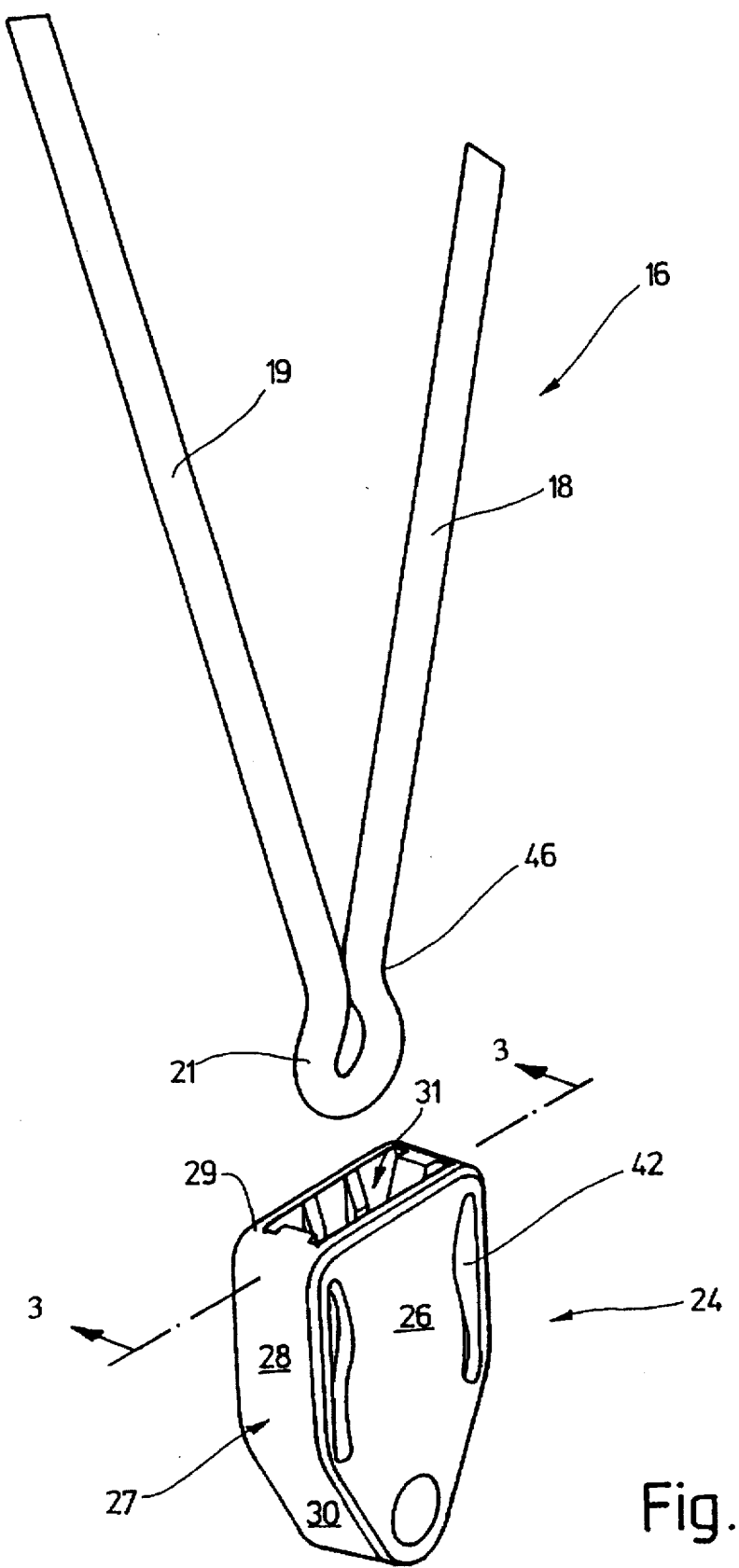
FIG. 2 shows an enlarged, perspective illustration of the latching device and the stay end of the mudguard arrangement according to FIG. 1.

A mudguard arrangement 14 comprising a mudguard 15 and a stay arrangement 16 is connected to the front-wheel fork 8. In a known manner, the mudguard 15 concentrically surrounds a front wheel 17 which is illustrated diagrammatically by a circular-arc line and is fastened in the fork 8. The stay arrangement 16 comprises, on each side of the wheel 17, two wire-shaped stays 18 and 19 which are connected integrally to each other, converge towards the dropout 12 and consequently diverge outward in the radial direction relative to the dropout 12. At that end at which they run toward each other, the two wire-shaped stays 18 and 19 on each side of the wheel are, as FIG. 2 shows, connected integrally to each other forming a loop or eye 21. The free ends of the stays 18, 19 which are remote therefrom are fastened in a known manner, for example by means of clamping elements 22, to sheet-metal tabs 23 which, for their part, are riveted to the inside of the mudguard 15.

At their end which is adjacent to the axle of the wheel 17 the two stays 18, 19 are inserted into a latching device 24 and held there by latching. The latching device 24 is fastened to the plate 12, to be precise on the outside of the fork 8, by means of a screw 25 which passes through a corresponding hole in the plate 12.

Figure 3:
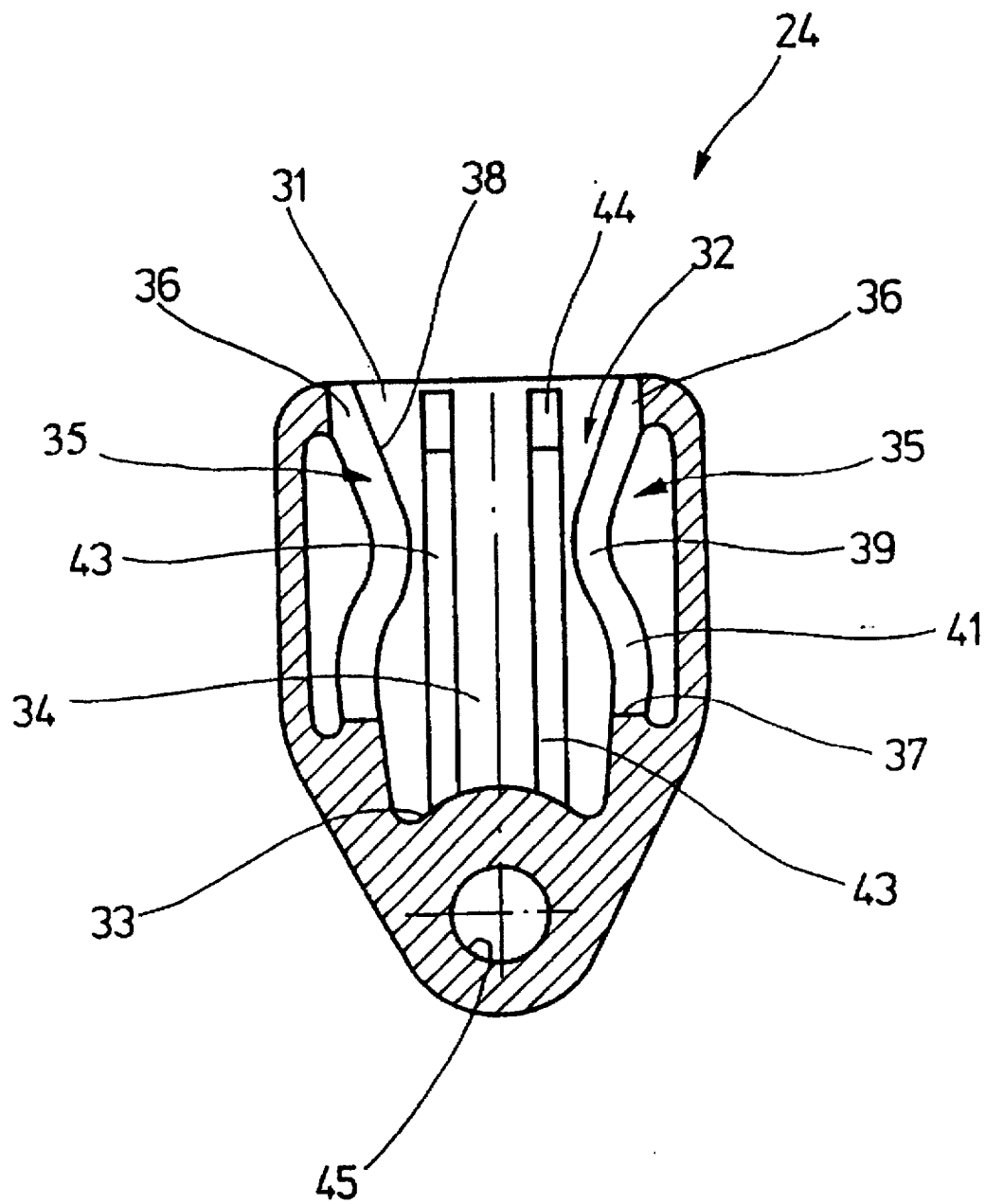
FIG. 3 shows the latching device according to FIG. 2 in a longitudinal section along the line I—I according to FIG. 1.

The latching device 24 is a shaped plastic part with the form shown in FIGS. 2 and 3.

The shaped plastic part is an approximately cuboidal body with two flat sides 26 which are parallel to each other and which are connected to each other via a side-wall arrangement 27. The side-wall arrangement 27 forms two elongate narrow sides 28 which run parallel to and at a distance from each other and between which there extends a crosswise narrow side 29. At that end which is remote from the crosswise narrow side the narrow longitudinal sides merge into two converging side-wall portions 30. In plan view the latching device 24 therefore has the form of a square which on one side borders an isosceles triangle.

The crosswise narrow side 29 contains an approximately rectangular insert opening 31 which is the entrance to a pocket 32 contained in the interior of the latching device 24. At its end which is remote from the insert opening 31 the pocket 32 ends flush against a base wall 33. The pocket 32 is furthermore delimited by two side walls 34, which run parallel to and at a distance from each other, and by two narrow side walls 35. The side walls 34 form the insides of the two flat sides 26 and, for reasons of illustration, only the rear side wall 34 can be seen in FIG. 3. In contrast, the narrow side walls 35 are leaf springs which in the vicinity of the base wall 33 merge integrally into the shaped part and also at their upper end at 36 are integrally formed onto the edge of the insert opening 31. As can be seen in FIG. 3 the two leaf springs 35, starting at the transition point 36 in the insert opening 31 as far as their lower end 37, are not connected laterally to the respectively adjacent side wall 34. Between the side wall 34 overlapping them and their flanks which are visible in FIG. 3 there is a gap of approximately 0.8 mm.

The two leaf springs 35 have a mirror-inverted form with respect to each other and start at the insert opening 31 with a straight portion 38. These two portions 38 converge, starting from the insert opening 31, toward the interior of the pocket 32. At a distance from the insert opening 31, the straight portions 38 merge into a curved region 39 which is adjoined by a further curved region 41 which has the inverse curvature and ends, for its part, at 37, i.e. at the end of the leaf spring 35. In the interior of the pocket 32, below the curved region 39, the clear cross section of the pocket 32 hence widens again, the distance at which the leaf springs 35 are apart from each other there corresponding to the width of the loop 21. The leaf springs 35 have a continuously constant, rectangular cross section.

For reasons of simplicity of the production tool, passage openings 42, one side wall of which follows the contour of the relevant leaf spring 35, are included between the leaf springs 35 and the narrow longitudinal sides 28 in the latching device 24. Two slides of the injection-molding die engage in these openings 42 in order to form the rear side of the leaf spring 35 without the exterior of the latching device 24 receiving the same oddly curved form. On the other hand, the continuous, narrow longitudinal sides 28 increase the rigidity of the latching device 24 as a whole and they improve the effectiveness, described further below, of the leaf springs 35.

For better guidance of the loop 21, on the two mutually opposite side walls 34 there are formed a total of four strips 43 which with regard to the opening of the pocket 32 are opposite one another in pairs. The strips 43 are provided at the insert opening 41 with a bevel 44. The distance at which the free surfaces of the strips 43 are from one another corresponds to the wire diameter of the loop 21.

Finally, at its lower end, i.e. in the triangular region, the latching device 24 contains a through hole through which the screw 25 is passed with the purpose of attachment to the dropout 12 as seen in FIG. 1.

The function of the mudguard arrangement thus described is as follows:

To the mudguard 15, which is made of a thin aluminum sheet or a plastic film—mudguards of this type are known under the designation "chromoplastics"—, there are riveted the sheet-metal tabs 23. The free ends of the stay arrangement 16 are inserted into the clamping pieces attached to said sheet-metal tabs, and are securely clamped. In this arrangement, the length of the stays 18, 19 depends on the desired diameter of the wheel 17 and the distance of the mudguard 15 from the tread of the wheel 17.

Onto the unit, assembled to this extent, of the mudguard and the two stay arrangements 16 there are pushed the latching devices 24. In the process the loop 21 passes through the insert opening 31 into the pocket 32. Because the outside diameter of the loop 21 is larger than the smallest distance at which the two leaf springs 35, in the region of the portions 39, are spaced apart from each other, further introduction of the loop 21 can only take place with the two leaf springs 35 simultaneously being forced back outward. This yielding movement of the leaf springs 35 is readily possible since they are connected to the rest of the structural elements of the latching device 24 only at the insert opening 31 and at their root 37. In particular, they are freely movable in an elastic manner outward in the region of the openings 42.

The fitting together of the latching device 24 and the stay arrangements 16 is complete as soon as the loop 21 strikes against the base wall 33 of the pocket. In this position, the latching device 24 is held fixedly on the relevant stay arrangement 16 by latching as the loop 21 merges, as can be seen in FIG. 2, toward the straight portions of the two stays 18, 19, into a constriction 46, the width of which is smaller than the smallest distance between the two leaf springs 35. Since the loop 21 is, moreover, circular on the outside, a limited pivoting movement of the latching device 24 on the loop 21 is possible until the straight portions 38 of the leaf springs 35 bear against the respectively adjacent stay 18 or 19. On the other hand, the dimensions are, however, selected such that the loop 21 is firmly pressed against the base wall 33 by the leaf springs 35.

The fitter can then mount the completely prepared mudguard arrangement 14 in a known manner on the front-wheel fork 8. To do this, he inserts a fastening screw through the hole 45 and through a corresponding hole in the dropout 12 and secures the screw with a corresponding nut. The mudguard 15 is attached to the fork head 9 in a known manner.

In its outward appearance, the stay arrangement [sic] 14, including the latching device 24, scarcely differs perceptibly from the customary fastenings of mudguards in which the loops 21 are screwed directly to the dropout 12.

Should the user of the bicycle having the mudguard arrangement 14 according to the invention have the misfortune 1 to have a stone wedge between the circumferential surface of the wheel 17 and 2 the mudguard 15 and for the stone to be conveyed by the wheel 17 further upward toward the fork head 9, it is nevertheless not possible for a hazardous situation to ensue. If the stone which has penetrated and been carried along by the tire of the wheel 17 tends to jolt the mudguard 15, this movement causes the two stay arrangements 16 to be pulled out of their latching devices 24. This eliminates the risk of the stays 18 or 19, which migrate upward on the wheel circumference and the length of which is dimensioned shorter than the diameter of the wheel 17, pulling the mudguard 15, which has been carried upward, against the tire and, due to the self-locking action which then occurs on the tire of the wheel 17, locking the wheel 17.

The same also applies should a wooden stick or branch enter into the spokes and be carried along by the rotating wheel 17 upward to the stays 18 and 19. In this case too the latch is released and prevents a risky situation as a consequence of a self-locking action between the mudguard 15 secured to the stays 18, 19 and the tire of the wheel 17. After the latch has been released the mudguard 15 may yield. In the known, rigid fastenings of the stays 18, 19 this stick would have pivoted the stays upward and they then, because of their decreasing effective length, which have pulled the mudguard against the tire and would thereby have locked the wheel 17 although the wooden stick or twig would have readily broken up without significant damage, for example on the fork tubes 11. Such a risk is not envisaged with the novel mudguard arrangement.

In general, with the novel mudguard arrangement the conditions do not develop sufficiently far for the mudguard 15 to be damaged because the loop 21 is pulled out of the latching device 24 beforehand. The user of the bicycle can afterwards readily press the loop 21 back into the latching device 24, resulting in the mudguard being correctly fastened again.

In another embodiment of the mudguard arrangement, per side of the mudguard 15 there is in each case only one stay, for example in the event of use in a rear wheel where the mudguard can be attached to the rear-fork stay and the rear-fork tube. Even in the variant with only one stay per side the described latching device 24 may be used in unaltered form. It is sufficient if a loop or eye, such as the loop or eye 21 in FIG. 2, is bent onto the relevant end of the individual stay.

A further detail can also be seen in FIG. 1. Should the stay or stay arrangement 16 come free from the latching device 24 while the wheel 17 is rotating in the forward direction, i.e. based on FIG. 1 in the anti-clockwise direction, it is possible, in particular in the case of individual stays, for the stay to fall downward with its end which is now free, and to slip between the spokes due to lateral rolling motions of the bicycle. The stay would subsequently be moved upward by the relevant spoke. Since, however, because of the use of the latching device 24 its length is shorter than would, at the most unfavorable point, correspond to the distance between the mudguard 15 and the circumference of the wheel hub, the relevant spoke of the wheel 17 readily moves the stay past without jamming against the hub. Above the hub of the wheel 17 the spoke carrying along the stay would, however, no longer run up to the stay, but rather it would run away from it and, as a result, would safely disconnect itself again from the stay. Locking of the wheel 17 due to a disengaged stay is hence likewise ruled out.

I claim:

1. Mudguard arrangement for a wheel of a two-wheeled vehicle which has a fork and a dropout to which the wheel is fastened, said arrangement comprising:

a mudguard, at least one stay on each side of the wheel, which stay is fastened by a radially outer-lying end thereof to the mudguard and which has a latch member on a radially inner-lying end thereof, said latch member being formed from an enlarged end portion of said stay, a latching device which is fastened rigidly to the fork and which serves to receive, in a latching manner, the latch member of the radially inner-lying end of the stay, wherein the latching device releasably receives and secures the latch member with a specified force that permits automatic detachment of the latch member from the latching device if the specified force exerted on said stay is overcome, said latching device including a housing for receiving said enlarged end portion therein and at least one biased locking member which is engageable with said enlarged end portion and which releasably secures said enlarged end portion within said housing.

2. Mudguard arrangement according to claim 1, wherein the latch member is formed by an eye on the stay.

3. Mudguard arrangement according to claim 2, wherein the stay is made of wire and the eye is formed by a loop into which the stay is bent.

4. Mudguard arrangement according to claim 1, wherein two stays are provided on each side of the wheel, both of the stays being provided with the latch member on their radially inner-lying end.

5. Mudguard arrangement according to claim 4, wherein the two stays lying on the same side of the wheel have a common latch member.

6. Mudguard arrangement according to claim 4, wherein the two stays lying on the same side of the wheel are connected to each other integrally.

7. Mudguard arrangement according to claim 4, wherein the two stays merge into each other in a loop which forms the latch member.

8. Mudguard arrangement according to claim 5, wherein, after the loop, the distance of the two stays from each other is smaller than the width of the loop.

9. Mudguard arrangement according to claim 1, wherein the housing can be fastened to the dropout and has an insert opening for the enlarged end portion of the stay.

10. Mudguard arrangement according to claim 9, wherein, after the insert opening, the housing has a pocket which receives the enlarged end portion of the stay.

11. Mudguard arrangement according to claim 9, wherein the biased locking member comprises at least one leaf spring.

12. Mudguard arrangement according to claim 9, wherein one end of the housing has a fastening hole for a fastening screw.

13. Mudguard arrangement for a wheel of a two-wheeled vehicle which has a fork and a dropout to which the wheel is fastened, said arrangement comprising:

a mudguard, at least one stay on each side of the wheel, which stay is fastened by a radially outer-lying end thereof to the mudguard and which has a latch member on a radially inner-lying end thereof, said latch member being formed from an enlarged end portion of said stay, a latching device which is fastened rigidly to the fork and which serves to receive, in a latching manner, the latch member, wherein the latching device has a housing which can be fastened to the dropout of the fork and has an insert opening for receiving and securing the latch member therein wherein at least one leaf spring is located in the interior of the housing after the insert opening, wherein said leaf spring is engageable with said enlarged end portion and releasably secures said enlarged end portion within said housing, said leaf spring adapted to automatically release said enlarged end portion of said stay if a specified exerted force on said stay is overcome.

14. Mudguard arrangement according to claim 13, wherein two leaf springs are provided which, with regard to a straight line which passes through the insert opening and which is perpendicular to a plane containing the insert opening, lie diametrically opposite each other within the housing.

15. Mudguard arrangement according to claim 14, wherein the leaf springs form side walls of a pocket of the housing that receives the enlarged end portion of the stay.

16. Mudguard arrangement according to claim 14, wherein the leaf springs are connected integrally to the housing at the insert opening.

17. Mudguard arrangement according to claim 14, wherein the leaf springs form a constriction in a pocket of the housing that receives the enlarged end portion of the stay.

18. A vehicle comprising:

a wheel rotatable about an axis;

a pair of forks which are positioned on opposite side of said wheel and which extend away from said axis;

a pair of dropouts which are located on opposite sides of said wheel and via which said forks are mounted on said wheel;

a mudguard overlying the wheel;

a stay which is positioned beside the wheel, which has a radially outer end fastened to said mudguard, and which has a radially inner end;

a latch member which is provided at said radially inner end of said stay, the latch member being formed from an enlarged end portion of said stay; and a latching device which is rigidly attached to one of said dropouts and which releasably receives said latch member, said latching device including a housing for receiving said enlarged end portion therein and at least one biased locking member which is engageable with said enlarged end portion and which releasably secures said enlarged end portion within said housing, said latching device being configured to hold said latch member with a latching force of a specified magnitude, wherein said latch member and said latching device are configured relative to one another such that, whenever a force is imposed on said stay which opposes said latching force and which has a magnitude which is greater than the specified magnitude of said latching force said latch member automatically releases from said latching device without additional resistance.

19. A vehicle as defined in claim 18, wherein said latching device includes a housing having an opening which receives said latch member, and a spring which is disposed within said housing and which imposes at least a portion of said specified force on said latch member.

* * * * *